United States Patent
Li et al.

(10) Patent No.: US 8,664,138 B2
(45) Date of Patent: *Mar. 4, 2014

(54) REGENERATING METHOD FOR ACTIVATED ALUMINA USED IN REGENERATING WORKING FLUID OF HYDROGEN PEROXIDE

(75) Inventors: Fuqing Li, Shanghai (CN); Xinsheng Ma, Shanghai (CN); Gang Chen, Shanghai (CN); Qiufang Wu, Shanghai (CN); Guojian Chen, Shanghai (CN); Yubao Gan, Shanghai (CN); Jinghui Yang, Shanghai (CN)

(73) Assignee: Shanghai Huaming Hi-Tech (Group) Co., Ltd., Xu Hui Shanghai (CN)

( * ) Notice: Subject to any disclaimer, the term of this patent is extended or adjusted under 35 U.S.C. 154(b) by 240 days.

This patent is subject to a terminal disclaimer.

(21) Appl. No.: 12/675,775

(22) PCT Filed: Jan. 28, 2008

(86) PCT No.: PCT/CN2008/070200
§ 371 (c)(1),
(2), (4) Date: Feb. 27, 2010

(87) PCT Pub. No.: WO2009/026793
PCT Pub. Date: Mar. 5, 2009

(65) Prior Publication Data
US 2011/0059008 A1 Mar. 10, 2011

(30) Foreign Application Priority Data
Sep. 29, 2007 (CN) .......................... 2007 1 0094050

(51) Int. Cl.
*B01J 38/26* (2006.01)
*B01J 20/00* (2006.01)
*C01B 15/023* (2006.01)
*C01F 7/02* (2006.01)

(52) U.S. Cl.
USPC ............. 502/47; 502/414; 423/628; 423/625; 423/590

(58) Field of Classification Search
USPC ........ 423/628, 625, 590; 50/414, 415, 25, 55; 552/265, 208, 212, 267; 502/414, 415, 502/25, 55
See application file for complete search history.

(56) References Cited

U.S. PATENT DOCUMENTS

| | | | | | |
|---|---|---|---|---|---|
| 2,401,739 | A | * | 6/1946 | Johnson | 502/43 |
| 4,061,598 | A | * | 12/1977 | Makar | 502/330 |
| 2002/0115554 | A1 | * | 8/2002 | Zhou | 502/28 |
| 2004/0192993 | A1 | * | 9/2004 | Lattner et al. | 585/639 |
| 2010/0310448 | A1 | * | 12/2010 | Wu et al. | 423/628 |
| 2011/0059008 | A1 | * | 3/2011 | Li et al. | 423/628 |

* cited by examiner

*Primary Examiner* — Jennifer Smith
(74) *Attorney, Agent, or Firm* — Global IP Services; Tianhua Gu

(57) ABSTRACT

A regenerating method for activated alumina used in regenerating working fluid of hydrogen peroxide comprises the following steps: adding deactivated alumina discharged from a regenerating bed for working fluid of hydrogen peroxide with fire resistant alumina into a reactor through the top of the reactor and settling by gravity, oxidizing atmosphere entering into the reactor from the bottom of the reactor and running upwardly, discharging regenerated alumina and fire resistant alumina through the discharging device on the bottom of the reactor, discharging exit gas through the discharge port on the top of the reactor, the reaction temperature ranging from 360-800° C., the residence time of solid feed in the reactor ranging from 3-15 h. The method is economic, environment-protective, safe, and low-costly. The regenerated alumina will not poison palladium catalyst.

10 Claims, No Drawings

REGENERATING METHOD FOR ACTIVATED ALUMINA USED IN REGENERATING WORKING FLUID OF HYDROGEN PEROXIDE

CROSS REFERENCE TO RELATED PATENT APPLICATION

The present application is the US national Stage of PCT/CN2008/070200 filed on Jan. 28, 2008.

FIELD OF THE INVENTION

The present invention relates to a regenerating method for activated alumina used in regenerating working fluid of hydrogen peroxide.

BACKGROUND OF THE INVENTION

As known to all, the industrial production of hydrogen peroxide by anthraquinone route is a cycle process, anthraquinones dissolved in organic solvent is hydrogenated into anthrahydroquinones in the presence of palladium catalyst, and then anthrahydroquinones are oxidized into anthraquinone peroxides using air or oxidizing atmosphere. The hydrogen peroxide solution and anthraquinone organic phase will be generated by extraction of anthraquinone peroxide by water. The anthraquinone solution related in the cycle of hydrogenation-oxidation-extraction is called working fluid in industry. Anthraquinones used are usually alkyl anthraquiliones, more frequently-used are 2-alkylanthraquinones, for example, 2-ethylanthraquinone, 2-amylanthraquinone, 2-butylanthraquinone and their 5,6,7,8-tetrahydro alkyl anthraquinone derivatives. The solution is usually binary solvent made of hydrocarbon solvent such as arene, alkane or cycloalkanes, and trioctyl phosphate, triethyl phosphate or methyl cyclohexanol acetate, for example, the binary solvent made of arene and trioctyl phosphate is more frequently-used.

During the process of hydrogenation reduction, the main reactions are the synthesis of anthrahydroquinone (AHQ) by reduction reaction of anthraquinone (AQ) (reaction 1) and the synthesis of tetrahydro anthrahydroquinones (THAHQ) by hydrogenation of anthraquinones (reaction 2), and the rate of the oxidation reaction of tetrahydro anthrahydroquinone to synthesize tetrahydroanthraquinone (THAQ) (reaction 7) is lower than the rate of the oxidation reaction of anthrahydroquinone (reaction 8). The higher the content of tetrahydro anthrahydroquinone is, the more the energy consumption of oxidation reaction process is, and the energy consumption content of the oxidation reaction process is higher than half of energy consumption of the whole cycle process.

In industry, anthraquinone, anthrahydroquinone, tetrahydroanthraquinone and tetrahydroanthraquinone are effective anthraquinones in working fluid. In addition, the side reaction of hydrogenation of tetrahydro anthrahydroquinone might be proceeded to generate octahydroanthrahydroquinone (OHAHQ) (reaction 3), theoretically, octahydroanthrahydroquinone can be oxidized to generate peroxide, however, the oxidation rate is very slow and it doesn't have any industrial value at all. Therefore, octahydroanthrahydroquinone is viewed as degradation product.

The cycle of reduction and oxidation repeated and the degradation products including hydroxyl anthrone (e.g. oxanthrone (OAT) in reaction 4), anthrone (e.g. anthranone (AT) and bianthrone (DAT) in reaction 5), and anthrahydroquinone epoxides (THAQE) (reaction 6) are generated during side reaction.

The reactions and side reactions in the reductive reaction process are as follows:

Reaction1:

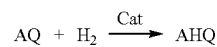

Reaction2:

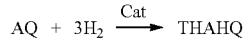

Reaction3:

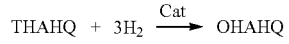

Reaction4:

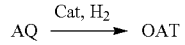

Reaction5:

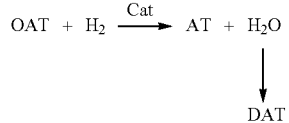

The reactions and side reactions in the oxidation process are as follows:

| | |
|---|---|
| THAHQ+O$_2$→THAQE+H$_2$O | Reaction6 |
| THAHQ+O$_2$→THAQ+H$_2$O$_2$ | Reaction7 |
| AHQ+O$_2$→AQ+H$_2$O$_2$ | Reaction8 |

During the productive cycle of hydrogen peroxide, useless degradation products generated in every cycle are limited in quantity. However, the accumulation of degradation products from many repeated cycles in the working fluid will reduce the concentration of the effective anthraquinones including anthraquinone and anthrahydroquinone in the working fluid which will cause many problems such as production efficiency. The working fluid should be regenerated to avoid the accumulation of such degradation products in it. The industrialized regenerating method in this field is contacting the working fluid with α-Al$_2$O$_3$ or γ-Al$_2$O$_3$ to transform the degradation products into effective anthraquinones. The alumina used as catalytic agent here is called activated alumina. For example, German Patent DE 1,273,499 described the process of transforming tetrahydroanthraquinone epoxides into tetrahydroanthraquinone by reducing action of tetrahydroanthrahydroquinone in the presence of basic alumina (reaction 9):

Reaction9:

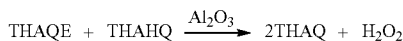

The regenerating process of working fluid mentioned in US statutory invention registration H1787 is contacting working fluid with γ-Al$_2$O$_3$ at the temperature of 50-100° C. before regenerated, 3 mol of tetrahydroanthraquinone are transformed into 1 mol of anthraquinone and 2 mol of anthrahydroquinone (reaction 10). In addition, it is also indicated that the transformation efficiency is low and there will be large amount of by-products generated because of immediate regeneration after reduction.
Reaction 10:

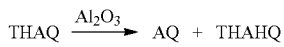

A regenerating method for working fluid used for the production of hydrogen peroxide was reported in Chinese patent CN1168654C. Alumina granular made by extrusion were used in this patent and alkali metals, alkaline-earth metals or rare earth elements were added into alumina. Preferably, the alumina had a granularity of no more than 3.5 mm and a specific surface area of no less than 50 m$^2$/g.

Such measures above are conducted to raise the transformation efficiency of the degradation products in working fluid or to extend the life time of alumina to reduce the cost of alumina replacement.

The deactivation reason of alumina used in the production process of hydrogen peroxide is the crystallization and precipitation of degradation products and polymers of the solvent ingredients which caused the decline of active surface area and the lost of alkaline composition in some techniques. In fact, the renewal period of activated alumina varies from several days to dozens of days according to different processes. The renewal of activated alumina is the focus of attention for the manufacturer of hydrogen peroxide. Firstly, the frequent renewal of activated alumina will raise the cost, and secondly, the deactivated alumina can't be disposed freely because it contains organics such as oxanthrone and so on which might cause the spread of pollution. However, there are few methods to deal with these problems and few patents that present the regenerating methods of deactivated alumina used in the production of hydrogen peroxide.

French Patent Fr 1,304,901 presents the regenerating method of activated sodium silicoaluminate alumina firstly. In the first place, the activated alumina should be washed using suitable solvent at the temperature of 80° C. and then treated by the steam of 130° C. to remove the residual solvent, and at last, the catalytic agent will be heat-treated for more than 1 hour, more preferred 8-12 hours at 400-450° C. This processing method also has disadvantages: high contents of residual carbon and sulfur in the regenerated alumina. The content of sulfur which might poison palladium catalyst will be transferred from the regenerated alumina to the working fluid.

U.S. Pat. No. 4,351,820 presents the high-temperature regenerating method of sodium silicoaluminate used for the production of hydrogen peroxide which has 55-63% of alumina, the method contains the steps comprising: adding the deactivated sodium silicoaluminate into the oven filled with oxidizing atmospheres at 650-700° C. and then the oven is heated to 700-850° C. The air and the deactivated sodium silicoaluminate are added continuously in the same direction by using gas external heating rotary kilns. This method needs additional heating energy to preheat gas and solid materials added into the oven and evaporation of a large number of water, and at last the combustion temperature of organics will be achieved therein. Although it will satisfy the requirements of repeated regeneration, the technical disadvantage of this method is the high cost.

SUMMARY OF THE INVENTION

The present invention provides a regenerating method for activated alumina used in regenerating working fluid of hydrogen peroxide to overcome the said defects of the existing technology.

The inventive concepts of the present invention are as follows:

because the deactivated alumina taken out from the facilities usually comprises 8-25% (by weight percent, the same below) of water and 8-22% of organics, the present invention assumed that the carbureted hydrogen organics are burned into carbon dioxide and water making use of combustion heat of organics in the presence of oxygen, and the heat of combustion is used to heat up the solid materials and oxidizing atmosphere without additional heat. The regenerated alumina processed by this method has low residual carbon and sulfur content, stable specific surface area and can be used in the reverse conversion of degradation products in working fluid during the production process of hydrogen peroxide and the alumina can be regenerated and applied repeatedly.

The method of the present invention comprises the following steps:

adding deactivated alumina discharged from a regenerating bed for working fluid of hydrogen peroxide with fire resistant alumina into a reactor through the top of the reactor and settling by gravity, oxidizing atmosphere entering into the reactor from the bottom of the reactor and running upwardly, discharging regenerated alumina and fire resistant alumina through the discharging device on the bottom of the reactor, discharging exit gas through the discharge port on the top of the reactor after several chemical and physical processes including preheating, evaporation of water, heating, burning and temperature reduction which are proceeded in turn.

Said fire resistant alumina is γ-Al$_2$O$_3$ spherical multi-aperture granular with a specific surface area (BET) of 70~250 m$^2$/g;

The mass ratio of deactivated alumina and fire resistant alumina is ranging from 1:5~5:1;

Most preferably, the total content of water in solid materials added into the reactor is ranging from 4~12%, the total content of organics is ranging from 4.5% to 9.5% according to control of the content of water and organics in deactivated alumina.

Said oxidizing atmosphere is selected from the group comprising the mixture of air and combustion gas, the mixture of air and nitrogen and/or carbon dioxide and air, wherein the volume fraction of oxygen ranging from 8% to 22%, preferably ranging from 15% to 21%.

Ordinarily, the deactivated alumina unloaded from the regenerating device of hydrogen peroxide working fluid comprises 8-25% (by weight percent, the same below) of water, total content of organics is ranging from 8% to 22% and the rest is inorganic framework materials such as alumina. For this kind of solid materials, it needs additional energy consumption to meet the heat that needed for the preheating of large number of gas and the sensible heat taken off in the situation of excessively low concentration of oxygen in the oxidizing atmosphere. In the situation of excessively high concentration of oxygen in the oxidizing atmosphere, the combustion velocity of the high-temperature combustion section is too fast and the temperature of solid particle raises rapidly, and phase change from $\gamma$-$Al_2O_3$ to $\alpha$-$Al_2O_3$ will happen in case the temperature of solid particle raise to above 1100° C. Additionally, the consequences of the phase change is the fusion of particles and micron grains in the particles which causes the decrease of micro pores inside the particles and specific surface area. In extreme cases, it might cause block of the moving bed reactor in unusual service conditions.

The reaction temperature is ranging from 360° C. to 800° C., and the stay time of solid materials in the reactor is ranging from 3 h to 15 h, preferably ranging from 4 h to 8 h.

The shorter the stay time is, the higher residual carbon in regenerated alumina will be. Additionally, it might effect the life time of regenerated alumina. The investment and operating cost of the facilities will be increased and it is uneconomical if the stay time is too long.

More preferably, the temperature of said oxidizing atmosphere before entering into reactor could be ranging from −10° C. to 450° C. and its pressure is ranging from 0.20 MPa to 0.60 MPa. Under normal operating conditions, the temperature of oxidizing atmosphere while entering into reactor is ranging from the dew point temperature of vapor at operating pressure to 60° C.

The volume-weight ratio of oxidizing atmosphere to solid materials based on the oxygen content of oxidizing atmosphere is as follows;
Oxygen:solid materials=0.08~0.30 $NM^3$/kg; $NM^3$ refers to normal cubic meters.

The non-limiting reactor employed in the present invention has the main characteristics of continuous or semi-continuous solid feeding device and gas discharge side in the upper part, continuous or semi-continuous discharge device and compressed gas inlet in the under part. In addition, the section shape of said reactor is available in shapes comprising square, rectangular and round. The height-diameter ratio of the reactor is ranging from 3 to 30, preferably ranging from 10 to 25.

The specific surface area of the regenerated alumina sphere obtained by the method of present invention is 50 $m^2$/g at least, and the residual carbon content is less than 0.5% (by weight percent), particle's compressive strength is 70N at least and the regenerated alumina could be used in regenerating working fluid during the production process of hydrogen peroxide once again and the regenerated alumina granular could be used once again with new alumina having a mass ratio ranging from 1:1 to 2:1.

The method is economic, environment-protective, safe, and low-costly. The regenerated alumina will not poison palladium catalyst. Therefore, the method in the present invention is simple and feasible for the industrialized production. The regenerating method of deactivated alumina in the present invention doesn't need supererogatory energy added under normal continuous operating conditions and therefore has prominent energy conservation characteristics, the organics are sufficiently burned into carbon dioxide and water that are released from the outlet of reactor at last, and the regenerated alumina can be used in regenerating working fluid during the production process of hydrogen peroxide without influence on the acid-base properties of working fluid or normal productivity of hydrogen peroxide and the energy consumption.

DETAIL DESCRIPTION OF THE INVENTION

EXAMPLE 1~4

The raw materials used are from Factory A and the deactivated alumina spherical particles unloaded from the regenerating device of hydrogen peroxide working fluid had an average grain diameter of 2 mm. The contents of water and organics of deactivated alumina form different cycle period were shown in Table 1.

Fire resistant alumina was $\gamma$-$Al_2O_3$ spherical granular with a diameter of 2.2±0.3 mm, a specific surface area (BET) of 160 $m^2$/g and a stacking density of 835 $kg/m^3$.

The actor was the cylinder having an inside diameter of 288 mm and a height-diameter ratio of 22.

Deactivated alumina discharged from a regenerating bed for working fluid of hydrogen peroxide was added into a reactor with fire resistant alumina through the top of the reactor and settled by gravity, Oxidizing atmosphere entered into the reactor from the bottom of the reactor and ran upwardly, then regenerated alumina and fire resistant alumina were discharged through the discharging device on the bottom of the reactor, and the exit gas was discharged through the discharge port on the top of the reactor.

The physico-chemical parameters of deactivated alumina were as follows:
Example 1, the compressive strength was 71N, and the stacking density was 974 $kg/m^3$;
Example 2, the compressive strength was 73N, and the stacking density was 973 $kg/m^3$;
Example 3, the compressive strength was 75N, and the stacking density was 975 $kg/m^3$;
Example 4, the compressive strength was 78N, and the stacking density was 974 $kg/m^3$;
The reaction parameters are as follows:

EXAMPLE 1

The gas pressure of reactor inlet was 0.22 MPa, the temperature was 38° C., the oxidizing atmosphere was air which containing 21% of oxygen by volume, the reaction temperature was 400° C., the stay time of solid materials in the reactor was 5.6 h, the volume-weight ratio of oxidizing atmosphere to solid materials based on the oxygen content of oxidizing atmosphere was as follows: oxygen:solid materials=0.13 $NM^3$/kg;

EXAMPLE 2

The gas pressure of reactor inlet was 0.22 MPa, the temperature was 40° C., the oxidizing atmosphere was air which containing 21% of oxygen by volume, the reaction temperature was 380° C., the stay time of solid materials in the reactor was 5.6 h, the volume-weight ratio of oxidizing atmosphere to solid materials based on the oxygen content of oxidizing atmosphere was as follows: oxygen:solid materials=0.14 $NM^3$/kg;

EXAMPLE 3

The gas pressure of reactor inlet was 0.22 MPa, the temperature was 38° C., the oxidizing atmosphere was air which containing 21% of oxygen by volume, the reaction temperature was 550° C., the stay time of solid materials in the reactor was 8.5 h, the volume-weight ratio of oxidizing atmosphere to solid materials based on the oxygen content of oxidizing atmosphere was as follows: oxygen:solid materials=0.22 NM³/kg;

EXAMPLE 4

The gas pressure of reactor inlet was 0.23 MPa, the temperature was 39° C., the oxidizing atmosphere was air which containing 21% of oxygen by volume, the reaction temperature was 450° C., the stay time of solid materials in the reactor was 6.5 h, the volume-weight ratio of oxidizing atmosphere to solid materials based on the oxygen content of oxidizing atmosphere was as follows: oxygen:solid materials=0.17 NM³/kg.

TABLE 1

|  |  | Example 1 | Example2 | Example 3 | Example 4 |
|---|---|---|---|---|---|
| Materials | Content of water, % wt | 11.4 | 10.2 | 13.4 | 11.7 |
|  | Content of organics, % wt | 17.2 | 20.1 | 14.5 | 18.4 |
|  | Mass content of deactivated alumina, % wt | 66.6 | 66.6 | 45.0 | 50.0 |
| Gas flow, m³/h |  | 38 | 40 | 40 | 40 |
| Products | Output, kg/h | 28.2 | 27.3 | 28.8 | 33.5 |
|  | BET, m2/g | 152.4 | 148.7 | 139.1 | 139.9 |
|  | Residual carbon, % | 0.2 | 0.3 | 0.2 | 0.3 |
|  | Compressive strength, N | 80 | 87 | 76 | 89 |

EXAMPLE 5

The product regenerated by the materials in example 1 and new activated alumina were used in regenerating working fluid of hydrogen peroxide and the mass ratio of the product regenerated by the materials in example 1 and new activated alumina was 1:1. The materials of example 2 were obtained after 7 days, and then the product obtained in example 2 and new activated alumina were used in regenerating working fluid of hydrogen peroxide and the mass ratio of the product obtained in example 2 and new activated alumina was 1:1. The materials of example 3 were obtained after 7 days, and then the product obtained in example 3 and new activated alumina were used in regenerating working fluid of hydrogen peroxide and the mass ratio of the product obtained in example 3 and new activated alumina was 1:1. The materials of example 4 were obtained after 7 days, and the products in example 4 still had great operating characteristics in specific surface area, residual carbon content and compressive strength. The stacking density of regenerated alumina was 830~835 kg/m³.

What is claimed is:

1. A method for regenerating deactivated alumina brought from regenerating working fluid in making hydrogen peroxide to become activated alumina consisting of following steps:

adding the deactivated alumina containing precipitation of degradation products and polymers with fire resistant alumina into a reactor through a top of the reactor and settling by gravity;

adding oxidizing atmosphere which runs upwardly into the reactor from a bottom of the reactor, and discharging regenerated alumina and the fire resistant alumina through a discharging device on the bottom of the reactor, discharging exit gas through a discharge port on the top of the reactor;

wherein, a reaction temperature is from 360° C. to 800° C., a stay time of the deactivated alumina and fire resistant alumina in the reactor is from 3 h to 15 h, and a volume-weight ratio of the oxygen contained in the oxidizing atmosphere to the deactivated alumina plus fire resistant alumina is:

oxygen:(deactivated alumina+fire resistant alumina) =0.08~0.30NM³/kg;

carbureted hydrogen organics in the deactivated alumina are exhausted by self-burning in the oxidizing atmosphere.

2. The method according to claim 1, wherein said fire resistant alumina is γ-$Al_2O_3$ spherical porous granules with a specific surface area (BET) of 70~250m²/g.

3. The method according to claim 1, wherein a mass ratio of the deactivated alumina and the fire resistant alumina is ranging from 1:5 to 5:1.

4. The method according to claim 1, wherein total content of water in the deactivated alumina and fire resistant alumina added into the reactor is ranging from 4% to 12%, and a total content of the precipitation of degradation products and polymers in the deactivated alumina added into the reactor is ranging from 4.5% to 9.5%.

5. The method according to claim 1, wherein said oxidizing atmosphere is selected from a group consisting of a mixture of air and combustion gas, a mixture of air and nitrogen and air, wherein a volume fraction of oxygen in the oxidizing atmosphere is ranging from 8% to 22%.

6. The method according to claim 1, wherein a volume fraction of oxygen in said oxidizing atmosphere is in a range from 15% to 21%.

7. The method according to claim 1, wherein the stay time is in a range from 5 h to 10 h.

8. The method according to claim 1, wherein a temperature of said oxidizing atmosphere before entering into the reactor is in a range from −10° C. to 450° C. and a pressure of said oxidizing atmosphere before entering into the reactor is in a range from 0.20 MPa to 0.60 MPa.

9. The method according to claim 8, wherein a temperature of oxidizing atmosphere when entering into reactor is in a range from a dew point temperature of vapor at an operating pressure to 60° C.

10. The method according to claim 1, wherein a section shape of said reactor is selected from square, rectangular and round, and the height-diameter ratio of the reactor is in a range from 3 to 30.

* * * * *